(12) United States Patent
Huang et al.

(10) Patent No.: US 11,081,936 B2
(45) Date of Patent: Aug. 3, 2021

(54) WET CAVITY ELECTRIC MACHINE

(71) Applicant: GE AVIATION SYSTEMS LLC, Grand Rapids, MI (US)

(72) Inventors: Hao Huang, Troy, OH (US); Jan Zywot, Centerville, OH (US); Xiaochuan Jia, Centerville, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 760 days.

(21) Appl. No.: 15/564,922

(22) PCT Filed: Apr. 10, 2015

(86) PCT No.: PCT/US2015/025221
§ 371 (c)(1),
(2) Date: Oct. 6, 2017

(87) PCT Pub. No.: WO2016/164032
PCT Pub. Date: Oct. 13, 2016

(65) Prior Publication Data
US 2018/0097424 A1  Apr. 5, 2018

(51) Int. Cl.
*H02K 9/197* (2006.01)
*H02K 3/34* (2006.01)
*H02K 9/22* (2006.01)

(52) U.S. Cl.
CPC ............ *H02K 9/197* (2013.01); *H02K 3/345* (2013.01); *H02K 9/22* (2013.01)

(58) Field of Classification Search
CPC .. H02K 1/20; H02K 3/34; H02K 3/38; H02K 5/128; H02K 9/005; H02K 3/345; H02K 9/197; H02K 9/22

USPC .............................................. 310/57–59, 215
See application file for complete search history.

(56) References Cited

U.S. PATENT DOCUMENTS

| | | | |
|---|---|---|---|
| 2,043,655 A | 6/1936 | Ehrmann | |
| 6,489,697 B1* | 12/2002 | Ozawa | H02K 3/30 310/254.1 |
| 6,664,669 B2* | 12/2003 | Oohashi | H02K 3/34 310/179 |
| 8,896,167 B2* | 11/2014 | McKinzie | H02K 9/19 310/61 |
| 9,300,189 B2* | 3/2016 | Hautz | H02K 1/32 |
| 2003/0193256 A1* | 10/2003 | Liebermann | H02K 9/22 310/194 |

(Continued)

OTHER PUBLICATIONS

Machine translation and First office action and search issued in connection with corresponding CN Application No. 201580078715.1 dated Nov. 14, 2018, 14 pages, China.

(Continued)

*Primary Examiner* — Emily P Pham
(74) *Attorney, Agent, or Firm* — McGarry Bair PC

(57) ABSTRACT

A wet cavity electric machine includes a stator core having two stator poles formed by a post and a wire wound about the post to form a stator winding, with the stator winding having end turns, and a rotor having two rotor poles and configured to rotate relative to the stator and a channel for liquid coolant to flow through the rotor, and at least one fluid port in fluid communication with the channel and the stator winding end turns wherein the end turns will be exposed to liquid coolant passing through the channel.

18 Claims, 5 Drawing Sheets

(56) References Cited

U.S. PATENT DOCUMENTS

| | | | |
|---|---|---|---|
| 2004/0066098 A1 | 4/2004 | Doherty et al. | |
| 2005/0097726 A1* | 5/2005 | Yamamoto | H01F 41/068 |
| | | | 29/606 |
| 2007/0236094 A1* | 10/2007 | Kaminski | H02K 1/278 |
| | | | 310/156.28 |
| 2008/0223557 A1* | 9/2008 | Fulton | H02K 5/20 |
| | | | 165/104.33 |
| 2013/0207395 A1* | 8/2013 | Huang | H02K 9/19 |
| | | | 290/46 |
| 2018/0048215 A1* | 2/2018 | Lassila | H02K 9/19 |
| 2018/0069455 A1* | 3/2018 | Engblom | H02K 9/19 |

OTHER PUBLICATIONS

International Search Report and Written Opinion issued in connection with corresponding PCT Application No. PCT/US2015/025221 dated Sep. 4, 2015.

International Preliminary Report on Patentability issued in connection with corresponding PCT Application No. PCT/US2015/025221 dated Oct. 10, 2017.

* cited by examiner

WET CAVITY ELECTRIC MACHINE

BACKGROUND OF THE INVENTION

Contemporary aircraft engines include electric machines, or generator systems, which utilize a running aircraft engine in a generator mode to provide electrical energy to power systems and components on the aircraft. Some aircraft engines can further include starter/generator (S/G) systems, which act as a motor to start an aircraft engine, and as a generator to provide electrical energy to power systems on the aircraft after the engine is running. Motors and generators can be wet cavity systems, wherein a cavity housing the rotor and stator is exposed to liquid coolant, or dry cavity systems, wherein the cavity is not exposed to liquid coolant. Dry cavity systems can also utilize liquid coolant in one or more contained cooling systems, but they are still considered dry cavity so long as the cavity is not exposed to liquid coolant. Both contemporary types of wet or dry cavity systems have respective advantages. For example, dry cavity systems generally have less losses, higher efficiency, higher reliability, less required maintenance, and attitude independence over wet cavity systems. In contrast, the power density of a wet cavity electric machine can be considerably higher than that of a dry cavity electric machine due to its higher cooling effectiveness.

The operating requirements or the operating environment of a generator system can increase the cooling requirements for either a wet cavity or dry cavity system. For example, generator systems proximate to the high temperature environment of a turbine engine can further include an external cooling jacket surrounding the stator or generator, whereby the cooling jacket exposes the outer surface of the stator to coolant traversing a cooling jacket. The addition of cooling systems typically increases the costs, complexity, and adds to the weight and size requirements of the generator system.

BRIEF DESCRIPTION OF THE INVENTION

In one aspect, a wet cavity electric machine includes a stator core having two stator poles formed by a post and a wire wound about the post to form a stator winding, with the stator winding having end turns, a rotor configured to rotate relative to the stator, and having two rotor poles and a channel for liquid coolant to flow through the rotor, a layer of thermally conducting and electrically insulating material encircling the stator winding between the stator core and the stator winding, and at least one fluid port in fluid communication with the channel and the stator winding end turns wherein the end turns will be exposed to liquid coolant passing through the channel.

In another aspect, a power generation system includes a wet cavity machine having a stator core having two stator poles formed by a post and a wire wound about the post to form a stator winding, with the stator winding having first and second end turns, a rotor configured to rotate relative to the stator, the rotor including two rotor poles and a channel for liquid coolant to flow through the rotor, a layer of thermally conducting and electrically insulating material encircling the stator winding between the stator core and the stator winding, and at least one fluid port in fluid communication with the channel and the stator winding end turns wherein the end turns will be exposed to liquid coolant passing through the channel. The power generation system exposes the end turns to the liquid coolant passing through the channel.

In yet another aspect, a method of assembling a stator core includes inserting a layer of thermally conducting and electrically insulating material into a set of slots of the stator core, and wiring a set of windings into the set of slots of the stator core in a two-pole configuration and having winding end turns extending axially past the set of slots. The thermally conducting and electrically insulating material is positioned between the stator core and the set of windings.

DESCRIPTION OF EMBODIMENTS OF THE INVENTION

Embodiments of the invention can be implemented in any environment using an electric motor regardless of whether the electric motor provides a driving force or generates electricity. For purposes of this description, such an electric motor will be generally referred to as an electric machine, electric machine assembly, or similar language, which is meant to clarify that one or more stator/rotor combinations can be included in the machine. While this description is primarily directed toward an electric machine providing power generation, it is also applicable to an electric machine providing a driving force or an electric machine providing both a driving force and power generation. Further, while this description is primarily directed toward an aircraft environment, embodiments of the invention are applicable in any environment using an electric machine. Thus, a brief summary of a contemplated environment should aid in a more complete understanding.

Figure 1:
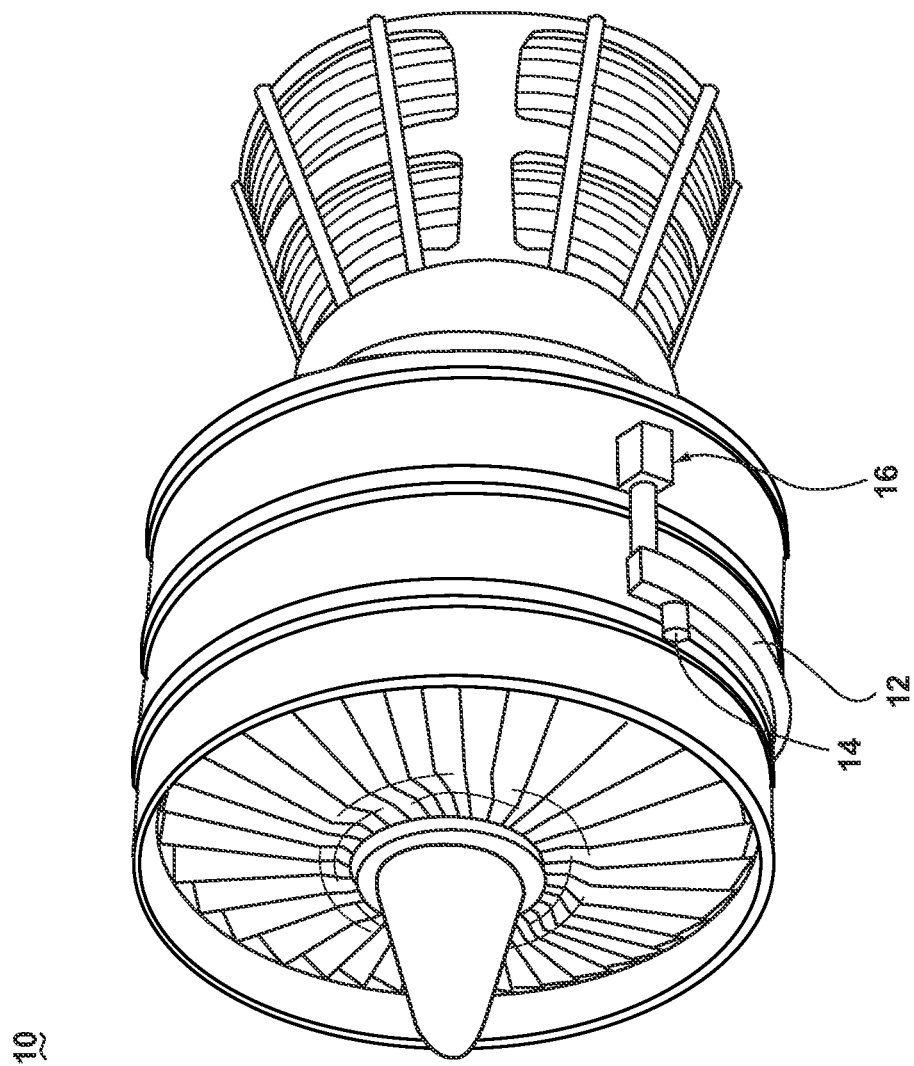
FIG. 1 is a perspective view of a gas turbine engine having a starter/generator (S/G) according to an embodiment of the invention.

FIG. 1 illustrates a gas turbine engine 10 having an accessory gear box (AGB) 12 and a starter/generator (S/G) 14 according to an embodiment of the invention. The gas turbine engine 10 can be a turbofan engine, such as a General Electric GEnx or CF6 series engine, commonly used in modern commercial and military aviation or it could be a variety of other known gas turbine engines such as a turboprop or turboshaft. The gas turbine engine 10 can also have an afterburner that burns an additional amount of fuel downstream of the low pressure turbine region to increase the velocity of the exhausted gases, and thereby to increase thrust. The AGB 12 can be coupled to a turbine shaft (not shown) of the gas turbine engine 10 by way of a mechanical power take off 16. The gas turbine engine 10 can be any suitable gas turbine engine used in modern commercial and military aviation or it could be a variety of other known gas turbine engines such as a turboprop or turboshaft. The type and specifics of the gas turbine engine 10 are not germane to the invention and will not be described further herein. While an S/G 14 is shown and described, embodiments of the disclosure can include any electrical machine or generator, and are not limited to generator embodiments that can provide starting functionality.

Figure 2:
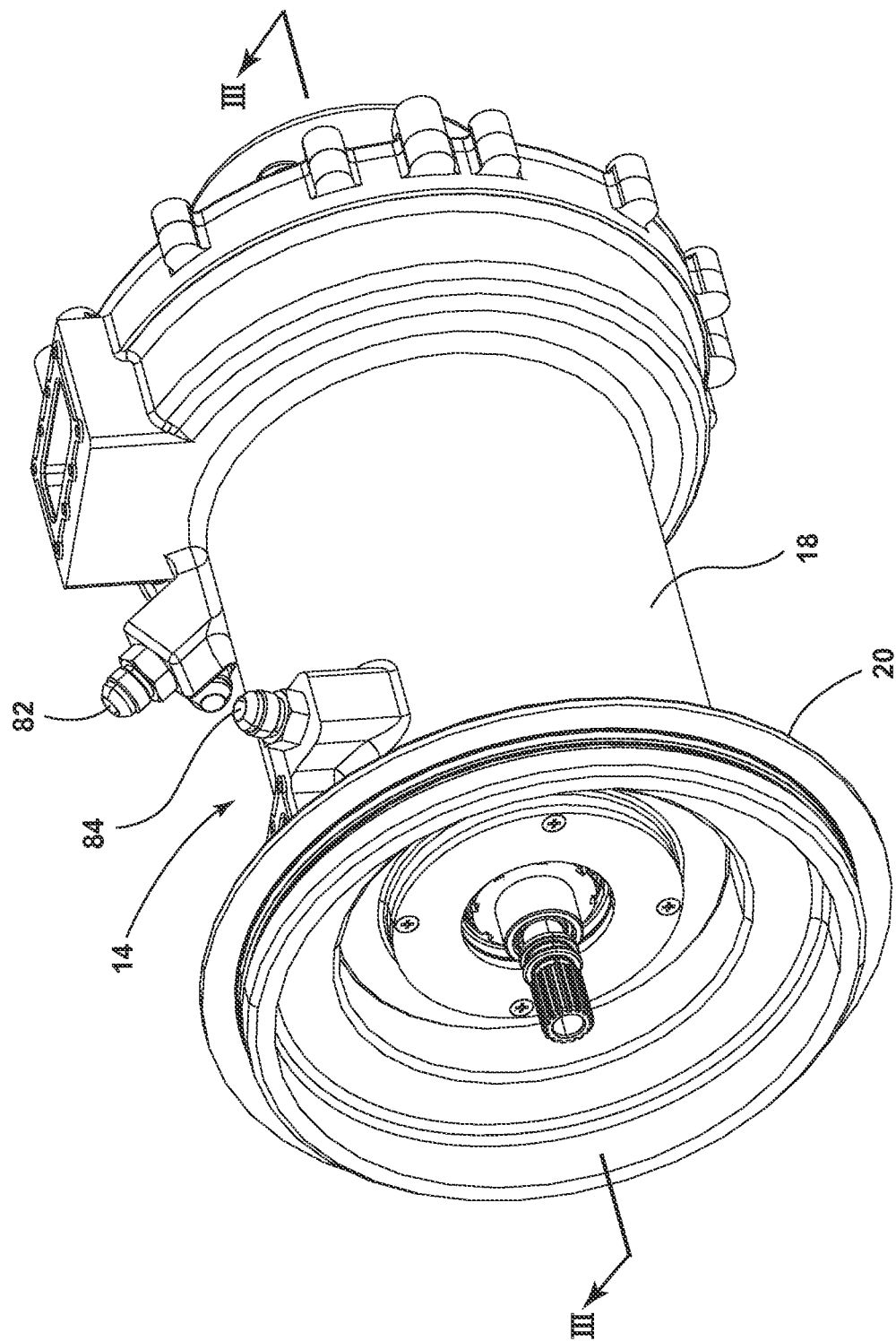
FIG. 2 is a perspective view of an exterior of the generator of FIG. 1.

FIG. 2 more clearly illustrates the S/G 14 and its housing 18, which can include a clamping interface 20, used to clamp the S/G 14 to the AGB 12. Multiple electrical connections can be provided on the exterior of the S/G 14 to provide for the transfer of electrical power to and from the S/G 14. The electrical connections can be further connected by cables to an electrical power distribution node of an aircraft having the gas turbine engine 10 to power various items on the aircraft, such as lights and seat-back monitors. The S/G 14 includes a liquid coolant system for cooling or dissipating heat generated by components of the S/G 14 or by components proximate to the S/G 14, one non-limiting example of which can be the gas turbine engine 10. For example, the S/G 14 can include a liquid cooling system using oil as a coolant. The liquid cooling system can include a cooling fluid inlet port 82 and a cooling fluid outlet port 84 for controlling the supply of coolant to the S/G 14. While not shown, embodiments of the disclosure can further include other liquid cooling system components, such as a liquid coolant reservoir fluidly coupled with the cooling fluid inlet port 82 and cooling fluid outlet port 84, and a liquid coolant pump to forcibly supply the coolant through the ports 82, 84 or S/G 14. Oil is merely one non-limiting example of a liquid coolant that can be used in embodiments of the disclosure.

Figure 3:
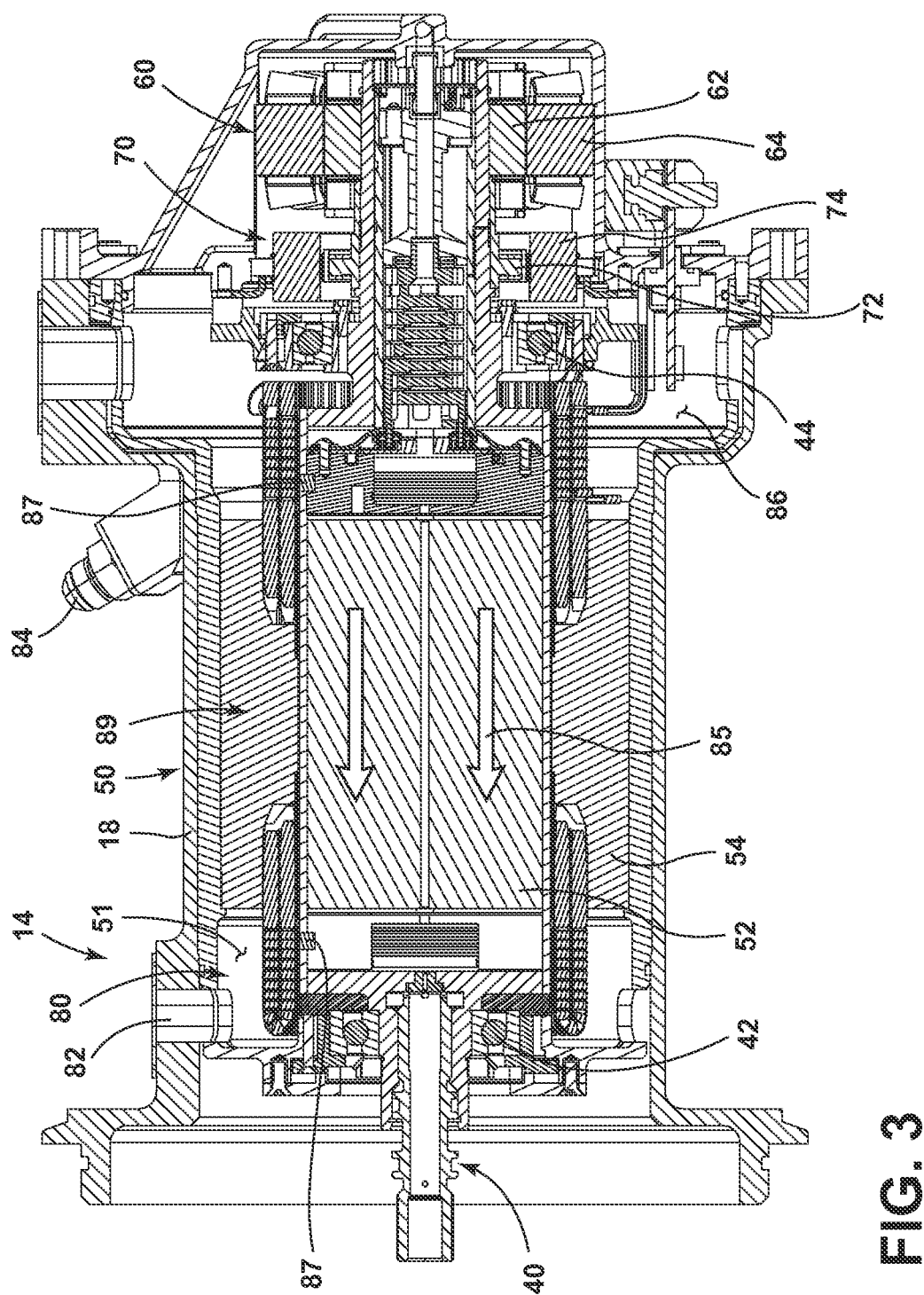
FIG. 3 is a schematic cross-sectional view of the S/G, taken along line III-III of FIG. 2.

The interior of the S/G 14 is best seen in FIG. 3, which is a sectional view of the S/G 14 shown in FIG. 2. A rotatable shaft 40 is located within the S/G 14 and is the primary structure for supporting a variety of components. The rotatable shaft 40 can have a single diameter or one that can vary along its length. The rotatable shaft 40 is supported by spaced bearings 42 and 44. Several of the elements of the S/G 14 have a fixed component and a rotating component, with the rotating component being provided on the rotatable shaft 40. Examples of these elements can include a main machine 50, housed within a main machine cavity 51, an exciter 60, and a permanent magnet generator (PMG) 70. The corresponding rotating component comprises a main machine rotor 52, an exciter rotor 62, and a PMG rotor 72, respectively, and the corresponding fixed component comprises a main machine stator 54 or stator core, an exciter stator 64, and a PMG stator 74. In this manner, the main machine rotor 52, exciter rotor 62, and PMG rotor 72 are disposed on the rotatable shaft 40. The fixed components can be mounted to any suitable part of the housing 18. The main machine stator 54, exciter stator 64, and PMG stator 74 define an interior through which the rotatable shaft 40 extends.

It will be understood that the main machine rotor 52, exciter rotor 62, and PMG rotor 72 can have multiple rotor poles and that the main machine stator 54, exciter stator 64, and PMG stator 74 can have multiple stator poles such that magnetic fields can be produced and the S/G 14 can operate through the interaction of the magnetic fields and current-carrying conductors to generate force. At least one of the rotor poles and stator poles can be formed by a core with a post and wire wound about the post to form a winding, with the winding having at least one end turn. The exciter 60 can provide direct current to the windings of the main machine 50 and the main machine 50 and PMG 70 can supply AC electrical power when the rotatable shaft 40 rotates.

The components of the S/G 14 can be any combination of known generators. For example, the main machine 50 can be either a synchronous or asynchronous generator. In addition to the accessories shown in this embodiment, there can be other components that need to be operated for particular applications. For example, in addition to the electromechanical accessories shown, there can be other accessories driven from the same rotatable shaft 40 such as the liquid coolant pump, a fluid compressor, or a hydraulic pump.

As explained above, the S/G 14 can be oil cooled and thus can include a cooling system 80. The cooling oil can be used to dissipate heat generated by the electrical and mechanical functions of the S/G 14. The cooling system 80 using oil can also provide for lubrication of the S/G 14. In the illustrated embodiment, the S/G 14 can be a liquid cooled, wet cavity system having the cooling system 80 illustrated as including the cooling fluid inlet port 82 and the cooling fluid outlet port 84 for controlling the supply of the cooling fluid to the cooling system 80. The cooling system 80 can further include, for example, a cooling fluid reservoir 86 and various cooling passages. The rotatable shaft 40 can provide one or more flow channels or paths (shown as arrows 85) for the main machine rotor 52, exciter rotor 62, and PMG rotor 72. As shown, the main machine rotor 52 can further include at least one fluid port 87, illustrated as two axially spaced fluid ports 87 such as a spray nozzle, in fluid communication with the one or more flow channels 85 and configured to expose at least a portion of the main machine cavity 51 to the coolant passing though the channels 85. For example, as the rotatable shaft 40 rotates, the at least one fluid port 87 can be rotated about the shaft 40 such that cooling fluid traversing the flow channels 85 can be exposed, sprayed, or otherwise deposited through the at least one fluid port 87 into the cavity 51, such as onto the windings, winding end turns, or onto alternative or additional components proximate to the rotational path of the fluid port 87.

In a wet cavity generator, the cooling fluid is permitted to directly contact, or be directly exposed to components in the main machine cavity 51, such as the main machine stator 54, or main machine rotor 52. This wet cavity approach increases the power density of the wet cavity S/G 14 due to its higher cooling effectiveness.

A problem with prior wet cavity approaches is that while the at least one fluid port 87 can be utilized to dissipate or remove heat from components in the main machine cavity 51 proximate to the port 87, components spaced from the at least one fluid port 87, for example, the axial center 89 of the main machine stator 54 which are spaced from either illustrated fluid port 87, can retain unwanted heat, resulting in reduced S/G 14 performance or output. Unwanted heat can be caused by, for example, stator core losses due to hysteresis or eddy currents generated during S/G 14 operations. Conventional generators can address this problem by including a low thermal conductive layer (e.g. approximately 0.12 Watts per degree Celsius-meter; "W/mC") between the stator and stator windings to thermally conduct a small portion of heat away from the stator to the windings, while an external cooling jacket thermally conducts the majority of heat away from the stator. A conventional external cooling jacket includes coolant passages encircling at least a portion of the main machine stator 54, wherein the jacket coolant passages are fluidly coupled with a liquid coolant source, such as the channel 85. The liquid coolant traversing the cooling jacket provides cooling to ensure desired S/G 14 operation, but the addition of cooling systems increases the costs, complexity, and adds to the weight and size requirements of the generator system.

The embodiments of the disclosure provide an alternative solution to address cooling problem of at least the main machine stator 54 by using a layer of thermally conducting and electrically insulating material to increase the main machine stator 54 cooling capability over contemporary embodiments. Since embodiments of the disclosure significantly increase the main machine stator 54 cooling capability, the S/G 14 can be designed or operated without, or free of, additional cooling systems external to the S/G 14, other than the cooling system 80 (e.g. channel 85, fluid ports 87, coolant pump, or coolant reservoir 86) described above. Stated another way, embodiments of the disclosure provide for a wet cavity S/G 14 wherein the system can be designed or operated without, or free of, at least an external liquid cooling jacket such that the system provides cooling greater than or equal to a predetermined level, wherein the predetermined level is based on an external liquid cooling jacket.

In contrast, contemporary stator end turns and windings are insulated with very low thermal conductivity materials causing a majority of the heat losses including the heat losses in the windings and end turns to go through the rotor and stator cores to reach the cooling system 80. For exemplary purposes, the remainder of this application will focus on the stator portion of the main machine 50; however, it will be understood that the following explanation can also be applied to the stator and rotor portions of the exciter 60, the PMG 70, and the main machine 50.

In general, a material is either an electrical conductor or an electrical insulator (i.e. electrically insulating) as the type of material allows electric charge to flow through it to a certain extent. The measure of how receptive a material is too electric current is called the electrical conductivity and those materials with a high conductivity are called electrical conductors while those with a low conductivity are called electrical insulators. Objects designed to have low resistance so that they transfer current with the least loss of electrical energy are called electrical conductors. Additionally, in general, a material is either a thermal conductor (i.e. thermally conducting) or a thermal insulator as the type of material allows heat to flow or traverse, through it to a certain extent, for example, via thermal conduction. The measure of how receptive a material is to thermal flow is called the thermal conductivity and those materials with a high conductivity are called thermal conductors while those with a low conductivity are called thermal insulators.

Figure 4:
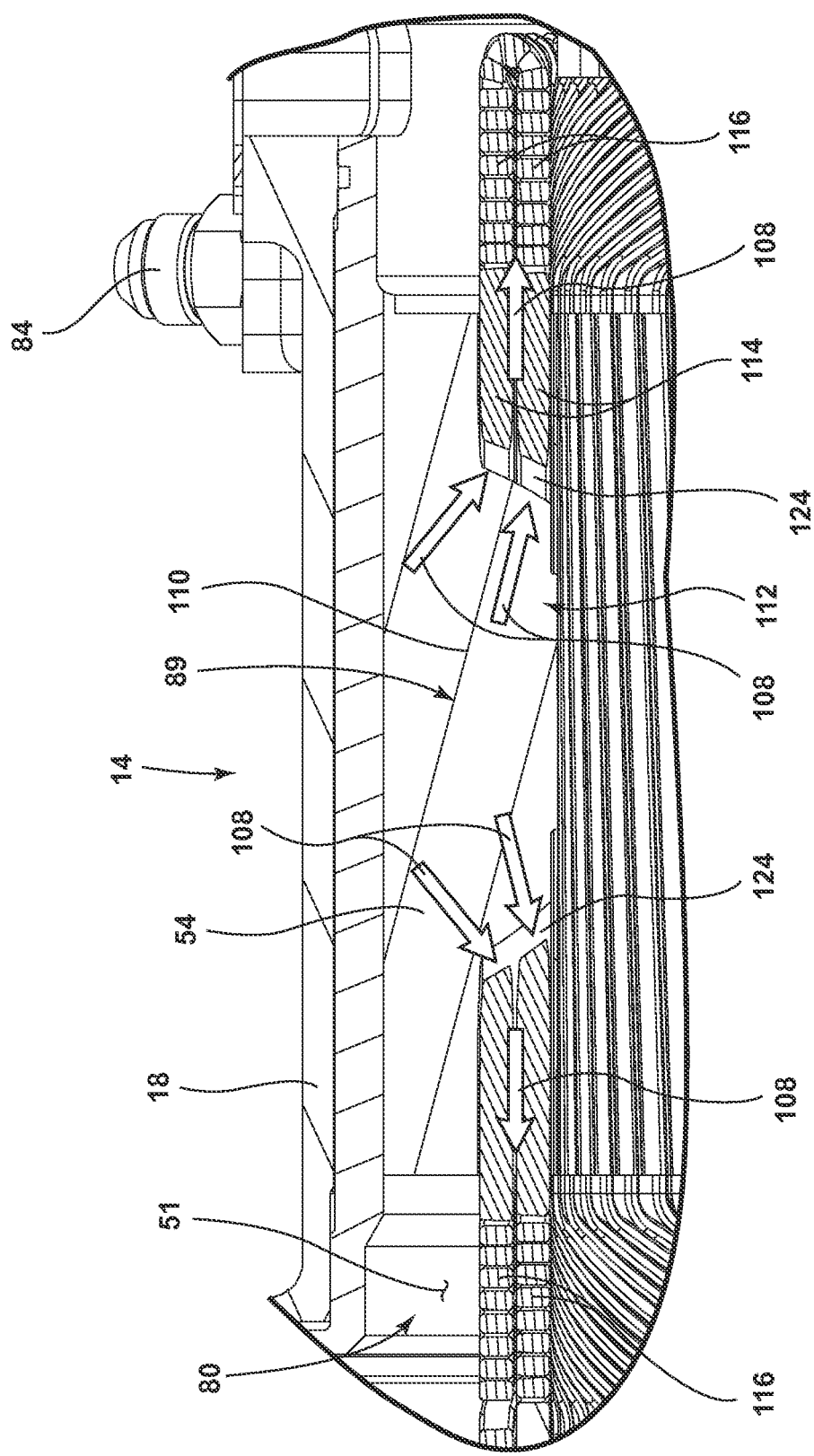
FIG. 4 is a sectional view of the stator of the main machine of FIG. 2.

FIG. 4 illustrates a section view of the main machine stator 54, which includes a stator core 110 having a number of posts 112. A set of windings 114 are formed when wire is wound about the post 112 and the portion of the winding segment that extends axially past either the front or rear of the post 112 forms at least one stator winding end turn 116. As shown, the axial ends of the windings 114 can be configured to have end turns 116, which collectively can define a set of end turns 116. It will be understood that only a portion of the windings 114 have been shown and that another portion extends along the other side of the post 112, and the configuration of the windings 114, posts 112, and end turns 116 can be repeated radially along the inner circumference of the main machine stator 54. As shown, the main machine stator 54 can further include a thermally conductive, electrically insulating layer 124 encircling at least a portion of the stator winding 114.

The insulating layer 124 can be formed from a thermally conducting and electrically insulating material provided between the windings 114 and the stator 54 defines a thermally conductive path or passageway, indicated by directional arrows 108, to significantly increase the thermal conductivity between the core 110 and the windings 114, and thus, the cooling capability between at least the axial center 89 of the main machine stator 54 and the end turns 116. The thermally conductive, electrically insulating layer 124 can be formed from a variety of materials including boron nitride, aluminum nitride, and aluminum oxide, or a similar material. It is also contemplated that the layer 124 can include a mixture that includes at least one of these materials. For example, the layer 124 can include a mixture including boron nitride. It is contemplated that the layer 124 can be in the form of a varnish or other coating such that the windings 114 can be coated with the mixture. Further, both a distinct layer and a varnish layer on the windings 114 can form the layer 124 and provide thermal conductivity and electrical insulation.

It is contemplated that the layer 124 can have a variety of properties that can aid in increasing the cooling capability. For example, the layer 124 can have a thermal conductivity greater than 1.2 W/mC, or approximately ten times the thermal conductivity of conventional liners. The layer 124 can have a minimum dielectric strength of 250 volts per millimeter (V/mm). The layer 124 replaces conventional thermal insulation barriers, which at least prevent or inhibit the conductive heat transfer between the main machine stator 54 and the windings 114 or end turns 116 and allows for a significant (e.g. ten times) increase in the capability to cool the stator 54.

The layer 124 can provide for thermal conduction 108 of heat generated from the stator core 110 to the windings 114. For example, the heat generated can be due to eddy currents or hysteresis. The windings 114 provide for thermal conduction via a conductive path 108 for heat along the windings 114 to the end turns 116. The end turns 116 are exposed to the coolant by way of the fluid ports 87 located proximate to the end turns 116. In addition to increasing the main machine stator 54 cooling capability, the layer 124 can also provide improved cooling capability along the length the stator windings 114 to the end turns 116. The non-limiting example thermal conductivity greater than 1.2 W/mC is capable of providing cooling of the stator 54, by way of thermal conduction 108, greater than or equal to a predetermined level of cooling based on an external liquid cooling jacket. Moreover, the non-limiting example of dielectric strength of 250 V/mm is configured to provide electrical insulation between the stator 54 and windings 114 in common S/G configurations. The thermal conduction and electrical insulation qualities of the layer 124 can be alternatively configured, or layer 124 material or compositions can be selected, based on desired operating characteristics of a generator or S/G including, but not limited to, thermal operating characteristics, electrical power generation characteristics, environmental thermal exposure, and the like.

Although the above embodiments have been described in terms of an S/G for a gas turbine engine, such a layer of thermally conducting and electrically insulating material as described above can be used in any electric machine to significantly increase the stator or rotor cooling capability. It will be understood that in such an electric machine the rotor can have multiple rotor poles and the stator can have multiple stator poles wherein at least one of the rotor poles and stator poles is formed by a core with a post and wire wound about the post to form a winding. A winding having at least one end turn and a layer of thermally conducting and electrically insulating material can be provided adjacent the winding and include the end turn. The above-described embodiments of the disclosure can be well-suited for certain S/G applications, such as a two-pole generator (e.g. two stator poles and two rotor poles) positioned proximate to the turbine engine, and thus creating a high temperature and space or volume-limited environment for generator operation. In this example, the two-pole generator can be configured such that the axial length of the wet cavity generator is significantly longer than the diameter of the stator core.

Figure 5:
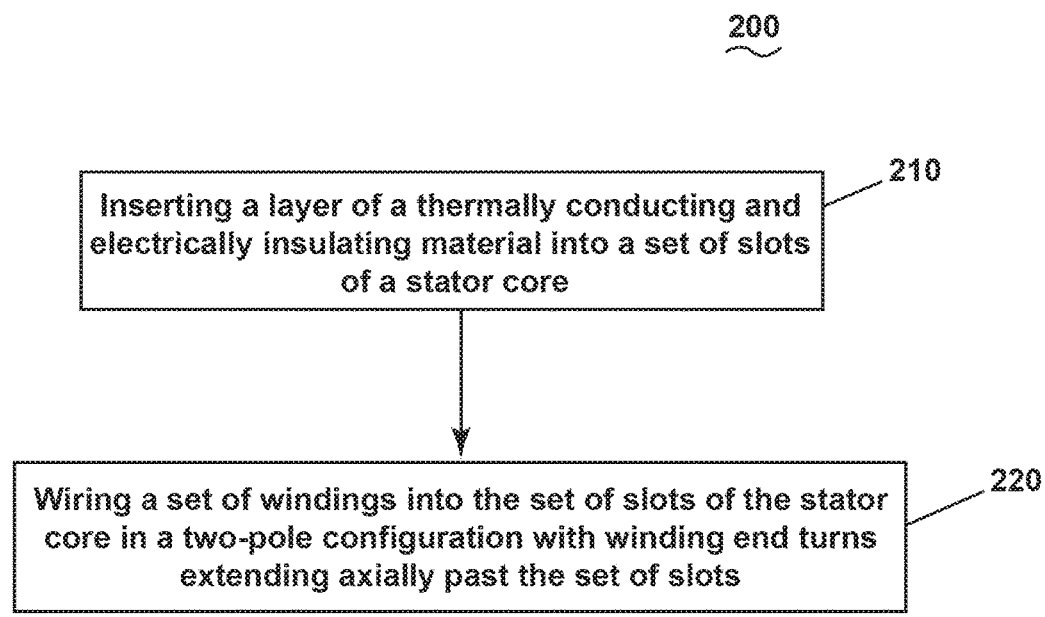
FIG. 5 is a flowchart illustrating a method of assembling the stator of the main machine.

FIG. 5 illustrates a method 200 for assembling a stator core according to the embodiments of the disclosure. The first step of the method 200 includes an inserting step 210 for inserting the layer 124 of thermally conducting and electrically insulating material into a set of slots of the stator core 110. The next step of the method 200 includes a wiring step 220 for wiring the set of windings 14 into the slot of the stator core 110 in a two-pole configuration and having winding end turns 116 extending axially past the slots. The thermally conducting and electrically insulating layer 124 is positioned between the stator core 110 and the windings 114.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method.

Many other possible embodiments and configurations in addition to that shown in the above figures are contemplated by the present disclosure. Additionally, the design and placement of the various components can be rearranged such that a number of different in-line configurations could be realized.

The embodiments described above provider for a variety of benefits including that they have higher efficiency, high reliability, less maintenance, all-attitude operation, and lower weight. By attaining increased cooling capabilities for the wet cavity electric machine free of cooling systems external to the machine other than exposing the end turns to the liquid coolant passing through the channel, the electric machine can eliminate the additional the costs, complexity, weight, and size requirements of the additional cooling systems otherwise needed. The resulting electric machine is lighter, smaller, and has less complexity than conventional wet cavity machines. Such a weight reduction is important in a turbine engine environment and provides a competitive advantage during flight. The reduced complexity can also correspond to reduced maintenance over time, also providing lower operating costs.

To the extent not already described, the different features and structures of the various embodiments can be used in combination with others as desired. That one feature cannot be illustrated in some of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wet cavity electric machine comprising:
   a stator core having two stator poles formed by a post and a wire wound about the post to form a stator winding, with the stator winding having end turns;
   a rotor configured to rotate relative to the stator core, and having two rotor poles and a channel fora liquid coolant to flow through the rotor;
   a layer of thermally conducting and electrically insulating material encircling the stator winding between the stator core and the stator winding; and
   at least one fluid port disposed within the rotor in fluid communication with the channel and the stator winding end turns wherein the end turns will be exposed to the liquid coolant passing through the channel.

2. The wet cavity electric machine of claim 1 wherein the at least one fluid port further comprises a fluid nozzle.

3. The wet cavity electric machine of claim 2 wherein the fluid nozzle is positioned on the rotor proximate to the end turns, such that the fluid nozzle on the rotor is configured to expose a set of stator winding end turns to the liquid coolant passing through the channel.

4. The wet cavity electric machine of claim 1 wherein the end turns are defined by a portion of the stator winding extending axially past the post.

5. The wet cavity electric machine of claim 1 wherein the layer has a thermal conductivity greater than or equal to 1.2 Watts per degree Celsius-meter.

6. The wet cavity electric machine of claim 5 wherein the layer comprises boron nitride.

7. The wet cavity electric machine of claim 5 wherein the layer comprises a mixture including boron nitride.

8. The wet cavity electric machine of claim 7 wherein at least one of the stator core or the stator winding is coated with the mixture.

9. The wet cavity electric machine of claim 1 wherein the layer has a minimum dielectric strength of 250 V/mil.

10. The wet cavity electric machine of claim 1 wherein the layer defines a thermally conductive passageway wherein heat generated in the stator core is conductively transferred along the thermally conductive passageway to the end turns.

11. The wet cavity electric machine of claim 10 wherein the thermally conductive passageway further conductively transfers heat generated in the stator winding to the end turns.

12. A power generation system includes:
    a wet cavity machine comprising:
    a stator core having two stator poles formed by a post and a wire wound about the post to form a stator winding, with the stator winding having first and second end turns;
    a rotor configured to rotate relative to the stator core, the rotor including two poles and a channel fora liquid coolant to flow through the rotor;
    a layer of thermally conducting and electrically insulating material encircling the stator winding between the stator core and the stator winding; and
    at least one fluid port disposed within the rotor in fluid communication with the channel and the stator winding end turns wherein the end turns will be exposed to the liquid coolant passing through the channel;
    wherein the power generation system exposes the end turns to the liquid coolant passing through the channel.

13. The power generation system of claim 12 wherein the wet cavity machine further comprises a starter generator.

14. The power generation system of claim 12 wherein the system is positioned proximate to a turbine engine.

15. The power generation system of claim 14 wherein an axial length of the wet cavity machine is significantly longer than a diameter of the stator core.

16. The power generation system of claim 12 wherein the at least one fluid port further comprises a fluid nozzle.

17. The power generation system of claim 12 wherein the layer has a thermal conductivity greater than or equal to 1.2 Watts per degree Celsius-meter.

18. The power generation system of claim 12 further comprising a rotatable rotor and wherein the at least one fluid port is positioned on the rotor proximate to at least one of the first or second end turns, such that the fluid nozzle on the rotatable rotor is configured to expose a set of stator winding end turns to the liquid coolant passing through the channel.

* * * * *

UNITED STATES PATENT AND TRADEMARK OFFICE
CERTIFICATE OF CORRECTION

PATENT NO. : 11,081,936 B2
APPLICATION NO. : 15/564922
DATED : August 3, 2021
INVENTOR(S) : Hao Huang, Xiaochuan Jia and Jan Zywot Page 1 of 1

It is certified that error appears in the above-identified patent and that said Letters Patent is hereby corrected as shown below:

In the Claims

Column 8, Claim 1, Line 7, reads "…a rotor configured to rotate relative to the stator core, and having two rotor poles and a channel fora liquid coolant to flow through the rotor";

Should read --…a rotor configured to rotate relative to the stator core, and having two rotor poles and a channel for a liquid coolant to flow through the rotor."--

Column 8, Claim 12, Line 53, reads "…a rotor configured to rotate relative to the stator core, the rotor including two poles and a channel fora liquid coolant to flow through the rotor";

Should read --…a rotor configured to rotate relative to the stator core, the rotor including two poles and a channel for a liquid coolant to flow through the rotor.--

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*